United States Patent [19]

McArthur et al.

[11] Patent Number: 5,634,574

[45] Date of Patent: Jun. 3, 1997

[54] BAKERY MIX DISPENSER

[75] Inventors: Brian K. McArthur; David A. McArthur, both of Arnold, Mo.

[73] Assignee: Unifiller Systems Inc., Richmond, Canada

[21] Appl. No.: 307,187

[22] Filed: Sep. 16, 1994

[51] Int. Cl.$^6$ ........................................................ B65B 3/04
[52] U.S. Cl. ........................ 222/334; 222/383.1; 417/550; 417/555.1
[58] Field of Search ........................ 222/334, 383.1; 417/550, 555.1, 900

[56] References Cited

U.S. PATENT DOCUMENTS

| | | | |
|---|---|---|---|
| 2,687,845 | 8/1954 | Young et al. | 417/555.1 X |
| 3,699,961 | 10/1972 | Szpur | 417/550 X |
| 3,715,061 | 2/1973 | Morine et al. | 222/334 |
| 3,743,448 | 7/1973 | Dorn | 222/383.1 X |
| 3,833,156 | 9/1974 | Hough | 222/383.1 X |
| 4,170,253 | 10/1979 | McArthur | 222/334 X |
| 4,228,924 | 10/1980 | Gilbert | 222/334 X |
| 4,651,897 | 3/1987 | Johnson | 222/381 X |
| 5,265,773 | 11/1993 | Harada | 222/334 X |

*Primary Examiner*—Kevin P. Shaver
*Attorney, Agent, or Firm*—Haverstock, Garrett & Roberts

[57] ABSTRACT

The present invention, in one form thereof, is an ergonomically useful dispensing assembly including a short dispensing tube adapted to be coupled at its inlet to a mixing bowl outlet. The outlet of the dispensing tube is coupled, for example, to a nozzle. A piston disposed within the tube has seals, such as O-rings which are sized to contact the interior surface of the dispensing tube along the length of the tube as the piston moves within the tube. The piston is constructed so that as the piston travels within the tube and from the tube inlet to the tube outlet, mix is forced through the outlet and mix is drawn into the tube through the tube inlet. As the piston travels from the tube outlet to the tube inlet, mix disposed within the tube travels through the piston. A check valve disposed adjacent the bowl outlet prevents backflow of mix from the tube into the bowl. The dispensing tube piston is driven by a dual piston-cylinder drive unit. The stroke length of the dual pistons is controllable. In operation, and with the inlet of the dispensing tube coupled to the outlet of a mixing bowl having mix disposed therein, a bowl cover or "follower" is inserted into the bowl on top of the mix. If the dispensing tube piston is initially disposed at the inlet end of the dispensing tube, the dual piston-cylinder drive unit forces the dispensing tube piston towards the tube outlet. As such piston is driven towards the dispensing end of the tube, any mix disposed between the piston and the tube outlet is forced out the nozzle. In addition, the suction or vacuum forces created by the forward movement of the piston relative to the dispensing tube pulls mix from the mixing bowl into the tube and between the dispensing tube inlet and the piston. When the pre-set stroke length of the dual pistons is reached, the drive unit reverses the direction of force applied to the dispensing tube piston. Mix disposed within the tube and between the tube inlet and the piston flows through the piston as the piston moves towards the inlet. Once the dispensing tube piston reaches the tube inlet, the piston reverses direction and once again forces mix through the tube outlet. The process is repeated until the desired amount of mix has been dispensed.

16 Claims, 13 Drawing Sheets

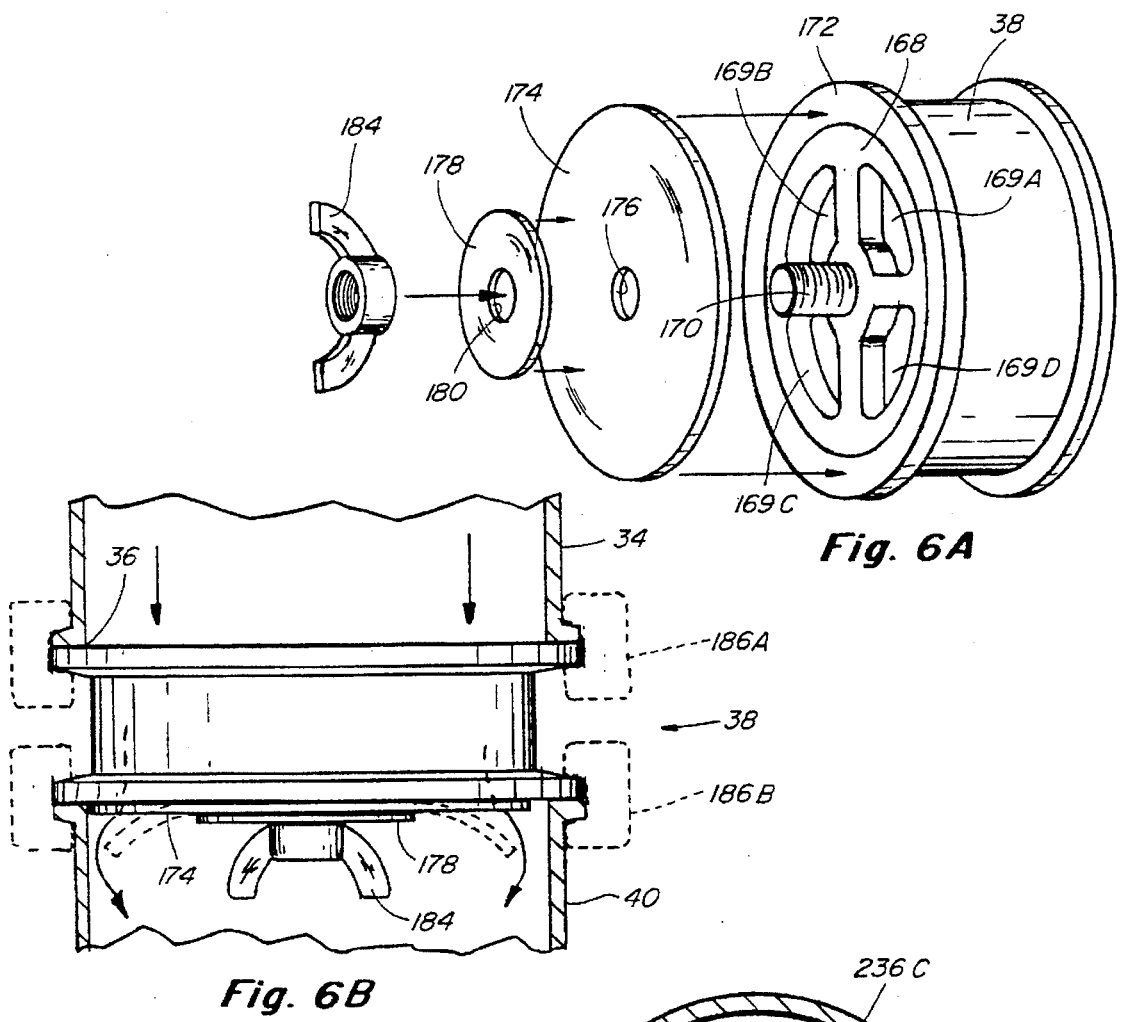
Fig. 6A
Fig. 6B
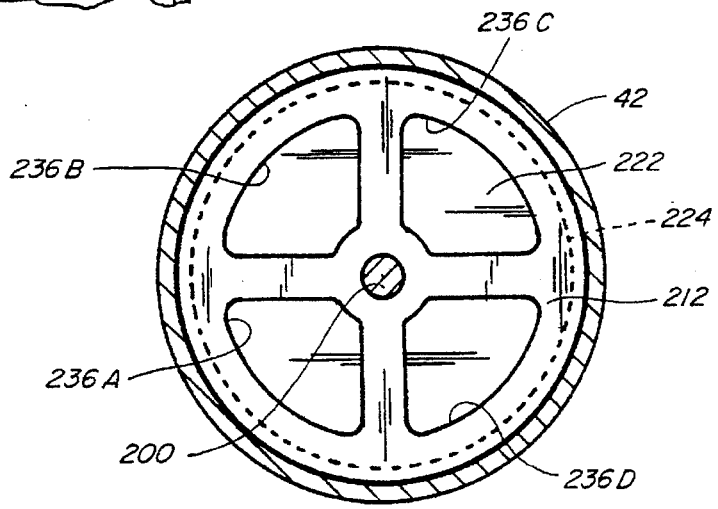
Fig. 10

BAKERY MIX DISPENSER

FIELD OF THE INVENTION

This invention relates generally to dispensers and, more particularly, to an improved bakery mix dispenser which may be used to discharge mix from a bowl under controlled conditions.

BACKGROUND OF THE INVENTION

In commercial bakeries, baking mixes such as cake batters, pastries, desserts, frostings, decorating materials and other materials are used in high volume production of light breads and desserts. In such high volume production, baking materials usually are loaded into a large mixing bowl and mixed utilizing commercial mixing machines. The mix is then dispensed from the bowl, for example, into cake tins or onto cakes or pastries.

Most basic ways to dispense mix from a mixing bowl into a cake tin include tipping the bowl and pouring the bowl contents into the tin and dipping a measuring cup into the bowl to fill the cup with mix which can then be poured from the cup into the tin. Since large commercial mixing bowls may be greater than two feet in diameter at the top and may weigh over three hundred pounds when full of mix, pouring the mix from the bowl is not practical. Further, in high volume commercial applications, manually dispensing mix from the bowl utilizing a ladle or a cup requires too much time and is inefficient.

In high volume commercial applications, hoppers sometimes are utilized to facilitate more quickly dispensing mix. With a hopper structure, a mixing bowl full of mix is lifted to the top of the hopper and the mix is poured from the bowl into the hopper. The mix then is dispensed from the hopper at an outlet located at a lower section of the hopper. Specifically, gravity forces acting on the mix cause the mix to flow out of the hopper outlet when the outlet is open.

Although hoppers improve productivity in a high volume applications as compared to manually dispensing the mix, there are a number of disadvantages associated with utilizing a hopper. For example, mixing bowls generally are heavy, and when loaded with mix, may weigh more than three hundred pounds. Lifting a bowl full of mix to the top of the hopper, which may be four to six feet above the ground, requires considerable effort and is dangerous. In addition, once no more of a particular mix in the hopper is required, the mix remaining in the hopper must be removed and the hopper must be cleaned and prepared for a different type of mix. Cleaning a large hopper, including its dispensing mechanism, can be time consuming. Gravity feed of mix through the hopper outlet also is a constraint on the speed of operations since the gravity forces acting on the mix generally cannot be increased to increase the rate of mix flow.

Dispensing pumps for dispensing mix directly from a mixing bowl also are known. A typical dispensing pump includes a piston and cylinder assembly and a discharge tube. In operation, an inlet of the pump is placed in the mixing bowl. Pressure forces created by the piston draw mix from the bowl, through the pump inlet, and into the discharge tube. Once the discharge tube is full of mix, and as more mix is drawn into the discharge tube from the bowl, mix is forced through the tube outlet.

The above described pump eliminates having to lift a heavy bowl above a hopper and cleaning of the hopper. With such a pump, however, when changing mix, the discharge tube must be cleaned. Such tubing can be rather lengthy and difficult to clean. In addition, since the discharge tube must first be filled with mix in order to force mix through the tube outlet, the discharge tube is filled with mix at the time no more mix is required to be dispensed. The mix in the discharge tube typically is discarded as part of the cleaning process. Since the discharge tube is lengthy, a substantial amount of mix is wasted. Further, the piston of such a pump usually operates at a high pressure to create the air forces necessary to compress the mix and reduce air entrainment. Operating a piston at such high pressures can be dangerous and workers must take extra safety precautions to avoid injury when working with such a device.

A commercially successful dispensing device is described in U.S. Pat. No. 4,170,253. Our father, Donald A. McArthur, is the inventor of the device described and claimed therein. U.S. Pat. No. 4,170,253 is hereby incorporated by reference herein. With our father's invention, an outlet is formed at a bottom portion of a mixing bowl and the dispensing device is mounted below the mixing bowl and attached to the bowl outlet. A dispensing tube receives mix from the bowl by gravity-assisted feed. A piston moves mix through the dispensing tube to the tube outlet. Relatively short lengths of dispensing tubing are utilized by the device Our father's invention has proven extremely useful. One great advantage is that no high pressure piston is required to draw mix into the tube. Therefore, the device is relatively safe to use as compared to other pumps. As with the gravity feed in hopper constructions, however, the gravity-assisted feed of mix from the bowl to the dispensing tube limits the flexibility and operation speed of the device. For example, flexibility is limited since a mixing bowl cannot be placed below the dispenser. In addition, particularly when working with a thick mix, such mix will not flow through the bowl outlet into the dispensing tube merely by gravity-forces and any other forces created by operation of the piston. The mix has to be forced, manually, through the bowl opening and into the tube. Once the tube is filled with mix, i.e., primed, then operations can be initiated. Such manual priming is time consuming.

Accordingly, it is desirable and advantageous to provide a dispensing assembly for high volume applications which utilizes controllable forces, other than or in addition to gravity forces, in connection with dispensing mix from a bowl. It is also desirable and advantageous to provide an assembly which is self-priming even when utilizing thick mix, flexible so as to enable placement of the mixing bowl above or below the dispensing device, and safe to utilize.

An object of the present invention is to provide a dispensing assembly which primarily utilizes forces other than gravity forces in dispensing mix from a bowl but does not require a piston assembly operating at high pressures.

Another object of the present invention is to provide a dispensing assembly which can draw mix from a bowl disposed in any position relative to the assembly, including even completely below the assembly and which is self-priming.

Yet another object of the present invention is to provide a dispensing assembly which can be easily cleaned.

A further object is to provide a dispensing assembly which includes a bowl cover adapted to descend and wipe clean the inside as mix is removed from the bowl.

Still yet another object of the present invention is to provide a dispensing assembly which operates at low pressures but enables quick dispensing of mix in measured quantities.

SUMMARY OF THE INVENTION

These and other objects of the invention are attained in an assembly constructed in accordance with the present invention. In carrying out the various objects of the present invention in one form thereof, a dispensing assembly is provided that includes a short dispensing tube adapted to be coupled at its inlet to a mixing bowl outlet. The outlet of the dispensing tube is coupled, for example, to a nozzle.

A piston disposed within the tube has seals, such as O-rings which are sized to contact the interior surface of the dispensing tube along the length of the tube as the piston moves within the tube. The piston is constructed so that as the piston travels within the tube and from the tube inlet to the tube outlet, mix is forced through the outlet and mix is drawn into the tube through the tube inlet. As the piston travels from the tube outlet to the tube inlet, mix disposed within the tube travels through the piston. A check valve disposed adjacent the bowl outlet prevents backflow of mix from the tube into the bowl. The dispensing tube piston is driven by a dual piston-cylinder drive unit. The stroke length of the dual pistons is controllable.

In operation, and with the inlet of the dispensing tube coupled to the outlet of a mixing bowl having mix disposed therein, a bowl cover or "follower" is inserted into the bowl on top of the mix. If the dispensing tube piston is initially disposed at the inlet end of the dispensing tube, the dual piston-cylinder drive unit forces the dispensing tube piston towards the tube outlet. As such piston is driven towards the dispensing end of the tube, any mix disposed between the piston and the tube outlet is forced out the nozzle. In addition, the suction or vacuum forces created by the forward movement of the piston relative to the dispensing tube pulls mix from the mixing bowl into the tube and between the dispensing tube inlet and the piston. When the pre-set stroke length of the dual pistons is reached, the drive unit reverses the direction of force applied to the dispensing tube piston. Mix disposed within the tube and between the tube inlet and the piston flows through the piston as the piston moves towards the inlet. Once the dispensing tube piston reaches the tube inlet, the piston reverses direction and once again forces mix through the tube outlet. The process is repeated until the desired amount of mix has been dispensed.

By controlling the stroke length of the dual pistons, the amount of mix dispensed with each stroke can be controlled. The dual piston construction also enables operating the assembly at low pressures. Further, since suction forces, or a vacuum, is utilized to draw mix from the bowl into the dispensing tube, the above described construction enables placement of the mixing bowl at any position relative to the dispensing device, even below the device and provides that the device is self-priming. In addition, since the dispensing tube length is relatively short, the device can be easily and quickly cleaned, and very little waste of mix results.

BRIEF DESCRIPTION OF THE DRAWINGS

FIGS. 6A–B are perspective views of a check valve assembly utilized to prevent backflow of mix from the dispensing tube into the mixing bowl;

FIG. 10 is a view of the dispensing tube piston along line 10—10 in FIG. 9A;

DETAILED DESCRIPTION OF THE DRAWINGS

The following detailed description is substantially separated into two parts. The first part is a detailed description of the mechanical elements of various forms of the preset invention. The second part is a detailed description of the air circuit which energizes and controls operation of the dual pistons of the drive unit.

Figure 1:
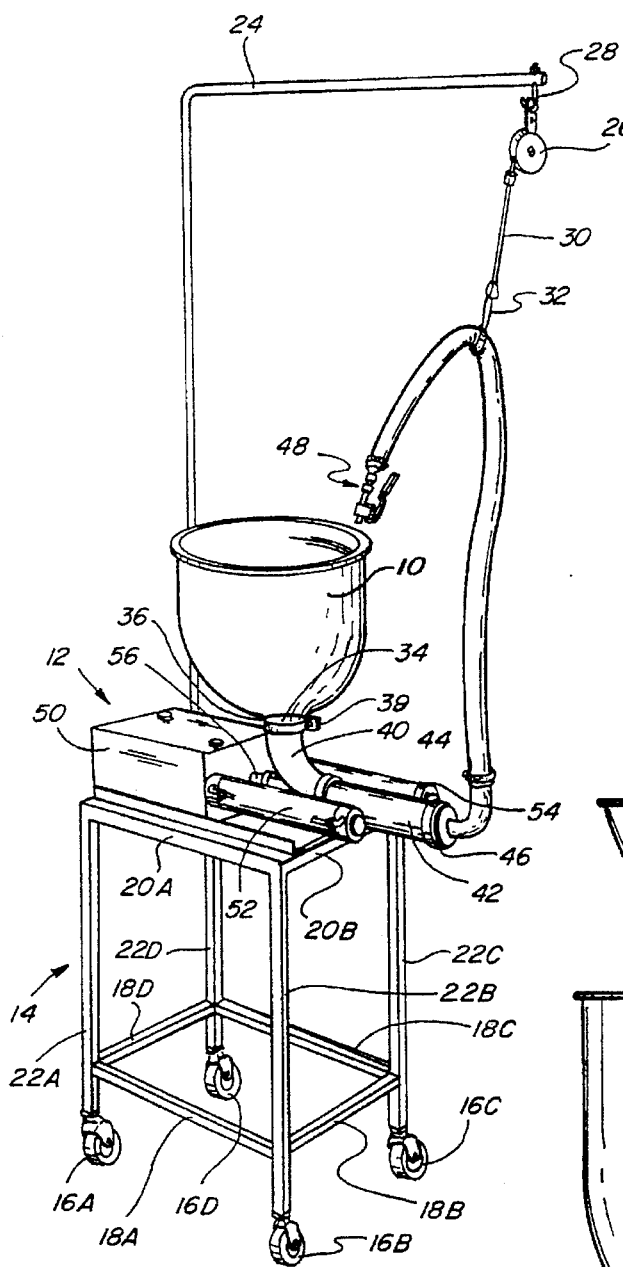
FIG. 1 is a perspective view of a mixing bowl disposed above a dispensing device embodying the present invention in a first form thereof.

With respect to the mechanical elements, FIG. 1 is a perspective view of a mixing bowl 10 and a dispensing device 12 embodying the present invention in one form thereof. Mixing bowl 10 and dispensing device 12 are supported on a cart 14 which is moveable on wheels 16A–D. Cart 14 includes a lower brace support having bars 18A–D and an upper brace support having bars 20A–D (only bars 20A–B are visible in FIG. 1). Vertical bars 22A–D extend between wheels 16A–D and upper brace support bars 20A–B. An L-shaped member is connected at one end to cart 14 and at the other end to pulley 26 by a hook 28. A cable 30 is wrapped around pulley 26 at one end and has a tube holder 32 connected to its other end.

Bowl 10 and dispensing device 12 are placed on top of bars 20A–D and are fully supported by cart 14. Bowl 10 has an outlet flange 34 forming opening 36. A check valve 38, which may include a check valve as hereinafter discussed, is utilized to engage flange 34 to one end of an elbow fitting 40. Elbow fitting 40 is connected at its other end to dispensing tube 42. A clamp 44 maintains fitting 40 and tube 42 in firm engagement. A flexible tube 44, which may be constructed from a silicon resin (e.g., platinum cured) or any other comparable plastic tubing material, is coupled to the outlet end of tube 42 by a clamp 46. At the other end thereof, flexible tube 44 has nozzle 48 coupled thereto. Flexible tube 44 is held by tube holder 32. A piston control and drive unit 50 including cylinders 52 and 54 is coupled to fitting 40 and dispensing tube 42 by a piston rod housing 56. A piston rod (not shown) extends from unit 50, through housing 56, and is connected to a dispensing tube piston (not shown) disposed within tube 42.

In operation, mix such as cake mix is disposed within bowl 10. A user actuates the pneumatic system, as hereinafter described and shown in more detail, and the pistons (not shown) in cylinders 52 and 54 drive the piston disposed within dispensing tube 42. As the dispensing tube piston moves from an initial position at the inlet end to the outlet end of tube 42, mix is forced out of dispensing tube 42 and into flexible tube 44. In addition, as the tube piston moves in such direction, mix disposed within bowl 10 is pulled, or sucked, into tube 42 through orifice 36 and elbow fitting 40. Therefore, tube 42 is primed for another piston stroke, i.e., self-priming.

Once the dispensing tube piston reaches its controlled stroke length, which is set by a user as hereinafter described, the dispensing tube piston is returned to its initial position at the inlet end of tube 42. The dispensing tube piston, as hereinafter described in detail, enables mix to flow through its body as such piston is moved from the tube outlet towards the tube inlet. The process is repeated until the desired amount of mix is dispensed.

By drawing mix into the inlet of the dispensing tube 42 as the dispensing tube piston forces mix through the outlet of such tube 42, a substantial amount of mix can be dispensed in a short time utilizing the above described device 12. Specifically, and in addition to gravity forces which may be acting on the mix, the forces, i.e., the vacuum forces, created by the piston as the piston moves towards the dispensing tube outlet cause the mix in bowl 10 to quickly fill tube 42. As soon as the piston is returned to the inlet end of tube 42, another piston stroke cycle can be initiated. Since such "drawing" forces are sufficiently strong, bowl 10 can be disposed at any position relative to device 12.

Figure 2:
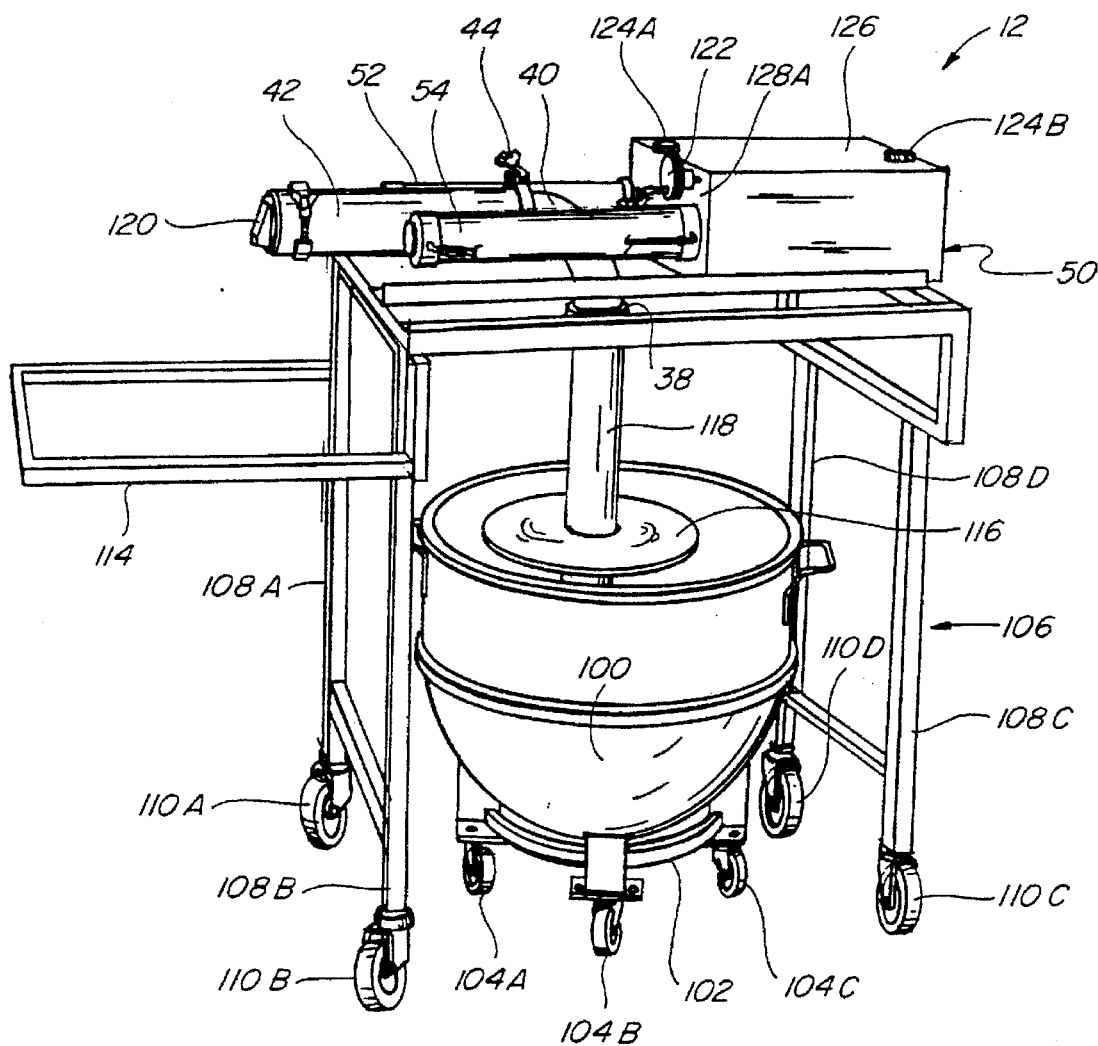
FIG. 2 is a perspective view of a mixing bowl disposed below a dispensing device embodying the present invention in a second form thereof.

For example, FIG. 2 illustrates a second form of the present invention wherein a bowl 100 is disposed below dispensing device 12. Bowl 100 is disposed on a moveable carriage 102 having four wheels 104A-D (wheel 104D is not visible). A cart 106 is adapted to have bowl 100 disposed between braces 108A-D and is supported on wheels 110A-D. Braces 108A-D connect to an upper support 112 which has device 12 disposed thereon. A tray holder 114 is detachably attached to and supported by upper support 112. A compacting, or anti-cavitation, disk 116 is connected to a suction tube 118 and at a location just above the inlet (not shown) to tube 118. One end of suction tube 118 is disposed within bowl 100 and the other end of suction tube 118 is coupled to elbow fitting 40 by check valve 38 (partially shown in FIG. 2). A nozzle 120 is clamped to the outlet end of dispensing tube 42. Nozzle 120 is used for dispensing mix directly into a container (not shown) disposed on tray holder 114.

Also shown in FIG. 2 is a rotatable stroke length adjustment handle 122. Such handle 122 is coupled to a position sensor (not shown in FIG. 2) disposed within drive unit 50 as hereinafter described. Threaded bolts (not shown) having hand grips 124A-B hold a U-shaped cover 126 of unit 50 to base plates 128A-B (plate 128B is not visible in FIG. 2)

Operation of the bottom feed assembly illustrated in FIG. 2 is similar to operation of the assembly illustrated in FIG. 1. One difference in operation, however, is that rather than partially relying upon gravity forces to facilitate moving cake mix, dispensing device 12 in the bottom feed assembly illustrated in FIG. 2 relies upon the suction forces created when the dispensing tube piston moves toward nozzle 120 to draw mix into tube 42 from bowl 100. These forces are sufficient to cause mix disposed in bowl 100 to be drawn through tube 118, through check valve 38 and elbow fitting 40, and into tube 42.

There are many advantages to utilizing the bottom feed assembly illustrated in FIG. 2. For example, in addition to the advantages of the top feed assembly illustrated in FIG. 1, the bottom feed assembly does not require a user to lift a bowl above dispensing device 12. By eliminating such lifting, the bottom feed assembly substantially reduces the possibility for injuries to workers. It should be recognized, of course, that compared to known hoppers, the top feed assembly in FIG. 1 significantly reduces the height to which a bowl must be raised, so even the top feed assembly reduces the possibility for worker injuries.

Figure 3:
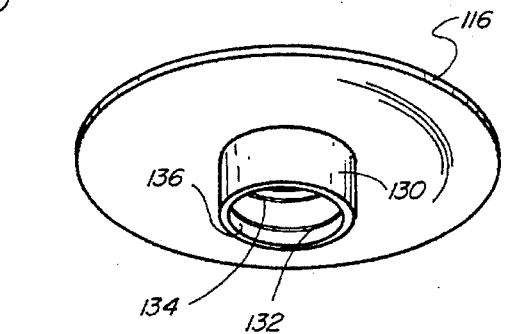
FIG. 3 is a perspective view of the compacting disk bowl cover utilized in connection with the assembly shown in FIG. 2.

FIG. 3 is a more detailed view of compacting disk 116 and better illustrates collar 130 and O-rings 132 and 134 disposed in a channel 136 formed by collar 130. In operation, channel 136 has suction tube 118 disposed therein and mix is drawn from bowl 100. O-rings 132 and 134 facilitate preventing mix and air from seeping between suction tube 118 and disk 116. Disk 116 facilitates preventing only mix initially immediately adjacent suction tube 118 being drawn therein, i.e., forming a cavity.

Figure 4:
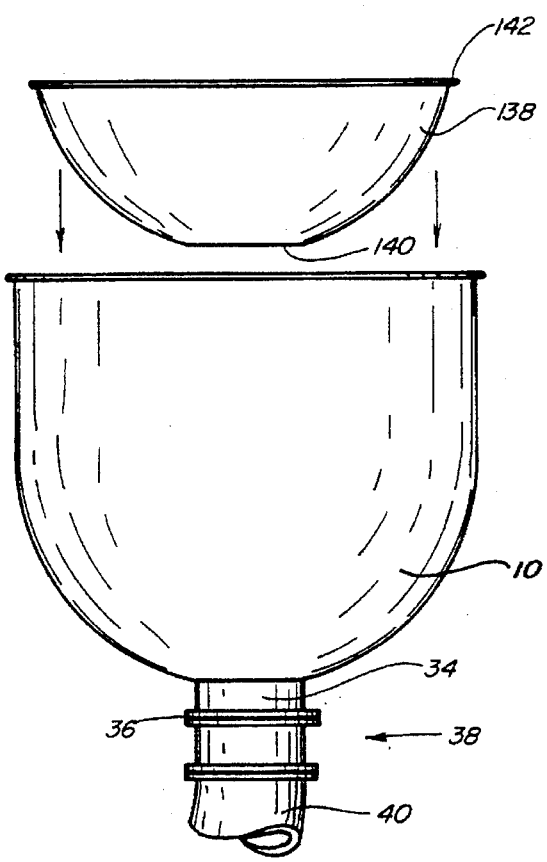
FIG. 4 is a perspective view of the mixing bowl shown in FIG. 1 including a bowl follower.

FIG. 4 illustrates a bowl follower 138 which may be utilized in the top feed assembly shown in FIG. 1. Bowl follower 138 is configured to have a curvature substantially the same as that of bowl 10, including a substantially flat lower portion 140. Follower 138 is disposed within bowl 10 and on top of the mix to facilitate forcing mix through flange 34, opening 36, coupling 38, and elbow fitting 40. Bowl follower 138 also assists in minimizing any waste of the mix by forcing substantially all of the mix towards opening 36. Rim 142 on bowl follower 138 also assists in achieving such objectives by ensuring that a significant portion of the mix will not be allowed to accumulate on the sides of bowl 10. Without bowl follower 138, mix in the bowl will cavitate, i.e., only mix disposed in the center of the bowl 10 and axially aligned with the bowl outlet 36 will be drawn out of the bowl.

Figure 5:
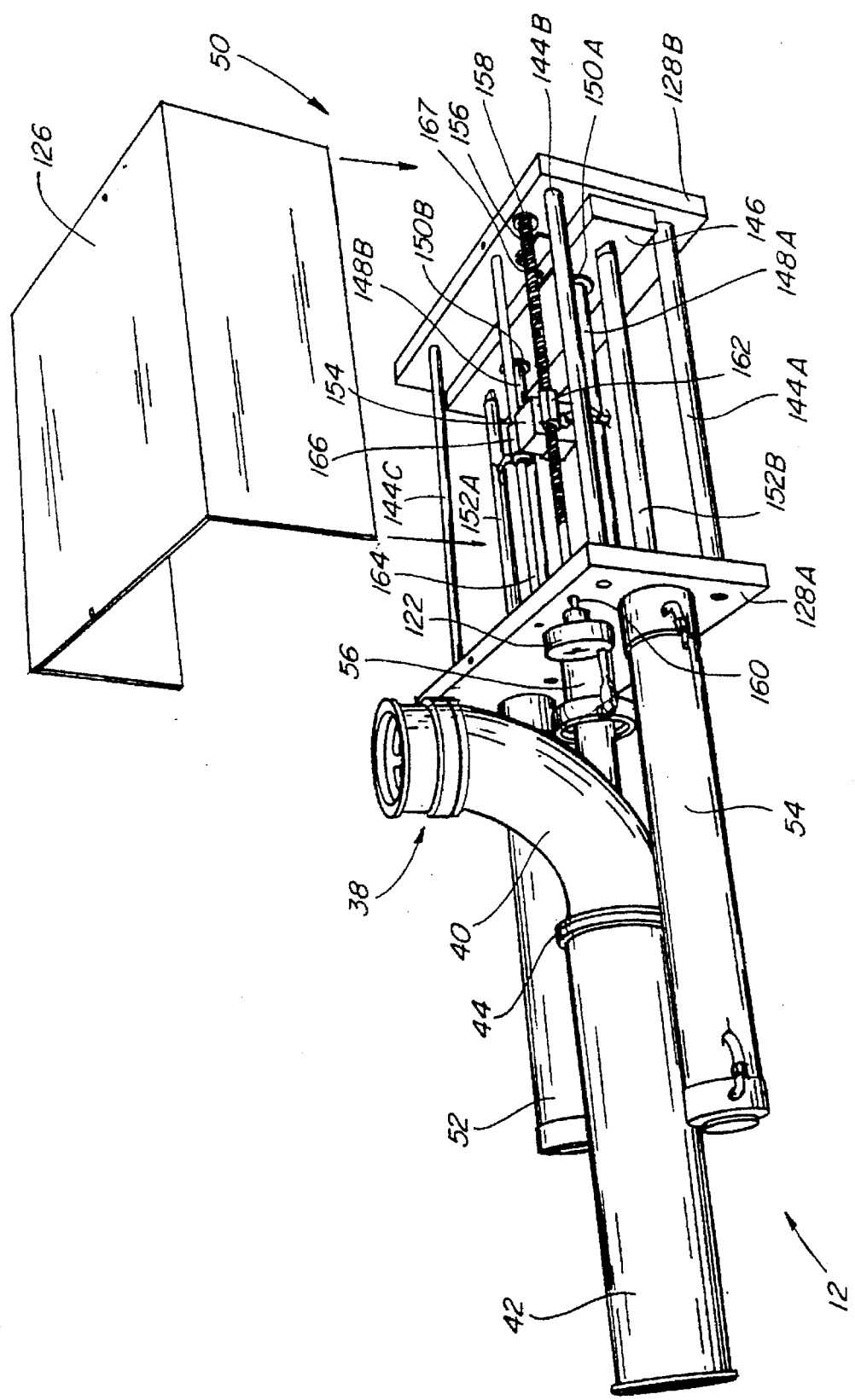
FIG. 5 is a perspective view of a dispensing tube and dispensing tube piston drive unit with a portion of the unit housing removed therefrom.

FIG. 5 is a more detailed view of dispensing device 12 and illustrates the interior of drive unit 50. Particularly, drive unit 50 includes braces 144A-D (brace 144D is not visible in FIG. 5) slip-fitted at each of their ends into openings formed in, and are disposed between, plates 128A-B so as to maintain such plates 128A-B spaced apart at a fixed distance. Particularly, threaded openings are formed in each of the ends of braces 144A-D and once braces 144A-D are slip-fitted into openings formed in plates 128A-B, a washer is aligned with the threaded openings and a threaded bolt is passed through the washer and into the threaded opening. As the bolts are tightened, the washers are drawn against plates 128A-B and firmly holds braces 144A-D in place.

A slider plate 146 is shown as being disposed adjacent plate 128B. Slider plate 146 is not in contact with plate 128B and is prevented from contacting plate 128B by the stroke length of cylinders 52 and 54. Slider plate 146 moves along guide rods 148A-B which are slip-fitted at each of their ends to plates 128A-B. Bushings 150A-B disposed within guide rod openings formed in slider plate 146 reduce friction between rods 148A–B and plate 146. Piston rods 152A–B which extend from pistons (not shown in FIG. 5) disposed in cylinders 52 and 54, respectively, are threadedly engaged to slider plate 146. Piston rods 152A–B are driven by a pneumatic system (not shown in FIG. 5) described hereinafter in detail.

A position control sensor 154 is mounted in unit 50 on a threaded rod 156, which is disposed at one end in a bushing 158 positioned within base plate 128B. Rod 156, at its other end, passes through an opening 160 (having a plastic bushing) formed in base plate 128A and is coupled to rotatable handle 122. A threaded guide member 162 attached to position sensor 154 has rod 156 inserted therethrough. A guide rod 164 is slip-fitted, in a manner identical to the slip-fitting of guide rods 148A–B, at its respective ends to plates 128A–B passes through an unthreaded guide member 166 attached to the other side of position sensor 154. Depending upon the type of threading on rod 156, clockwise or counter clockwise rotation of handle 122 moves position sensor 154 away from or towards base plate 128B. As explained hereinafter, the relative position of sensor 154 from base plate 128B controls the stroke length of the piston rod (not shown in FIG. 5) connected at one end to slider plate 148 and at its other end to the dispensing tube piston (not shown in FIG. 5).

In operation, as piston rods 152A–B are drawn into piston cylinders 52 and 54, slider plate 146 moves axially away from base plate 128B and towards base plate 128A. Such movement, of course, causes the dispensing tube piston rod to move towards the outlet end of dispensing tube 42. Such movement causes the piston disposed within dispensing tube 42 and coupled to the dispensing tube piston rod to push mix contained within dispensing tube 42 toward the dispensing tube outlet. Movement in such direction continues until a "trigger" plate 167 mounted to slider plate 146 contacts control sensor 154. Upon making such contact, control sensor 154 signals the pneumatic system to reverse direction and therefore causes piston rods 152A–B to reverse direction thereby moving slider plate 146 back towards its initial position adjacent base plate 128B. Such movement, of course, causes the dispensing tube piston rod to also move back towards its initial position and therefore pulls the piston disposed within dispensing tube 42 towards the inlet of dispensing tube 42 while allowing mix to flow through the piston.

The following is a detailed description of specific components of the top and bottom feed configurations. Particularly, FIGS. 6A and 6B are more detailed views of check valve 38. Referring to FIG. 6A, check valve 38 includes a cross member 168 having flow channels 169A–D. Cross member 168 is similar to the cross bar of the dispensing tube piston hereinafter discussed in detail. A threaded boss 170 extends from member 168. A flexible disk 174 having an opening 176 formed therein and a metal washer 178 having an opening 180 are slidably coupled to boss 170. Wing nut 184 is tightened so that flexible disk 174 is firmly held against cross member 168.

FIG. 6B illustrates the flow of mix through valve 38. Particularly, mix flows through flange 34 and opening 36 of bowl 10 and into check valve 38, which is maintained in position relative to bowl 10 by annular clamps 186A–B shown in phantom. Mix flows through check valve 38 and forces the edges of flexible disk 174 downward as indicated. The mix then flows into elbow fitting 40. If the mix attempts to flow from elbow portion 40 towards bowl 10, flexible disk 178 is pushed against the cross member 168. Disk 178 is sufficiently rigid so that when supported by the cross bars of member 168 and washer 178, disk 178 blocks the passage of any mix from elbow fitting 40 into bowl 10.

Figure 7:
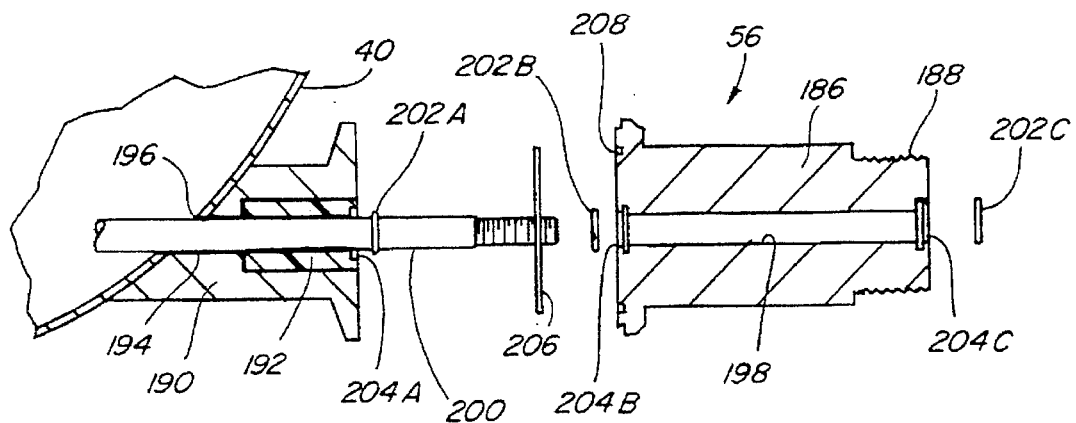
FIG. 7 is partial cross section view, with parts cut away, of a dispensing tube piston rod.

FIG. 7 is a cross section view of the dispensing tube piston rod housing 56 disposed between base plate 128A (not shown in FIG. 7) and elbow fitting 40. More particularly, housing 56 is composed of a first flange 186 having threads 188 on one end thereof and a second flange 190 mounted, such as by welding, to elbow fitting 40. A plastic bushing 192 is mounted within flange 190 and a channel 194 is axially aligned with bushing 192 and opening 196 formed in fitting 40. A channel 198 is formed in first flange 186. Piston rod 200 extends through opening 196, channel 194, bushing 192, and channel 198. Piston rod 200 is connected, at one end and within dispensing tube 42, to a piston (not shown in FIG. 7) and at its other end to slider plate 146 (not shown in FIG. 7). O-ring 202A is disposed between bushing 192 and rod 200. O-ring 202B is disposed within groove 204B. Annular grooves 204A–C formed in bushing 192 and flange 186 receive o-rings 202A–C, respectively. O-ring 206 mates with a groove 208 formed in flange 186. A coupler (not shown) is utilized to firmly engage flanges 186 and 190, and o-rings 202A–C and 206 seal any openings between such members. As the coupler is tightened, o-rings 202A and 206 form a seal between first flange 186 and second flange 190.

Figure 8:
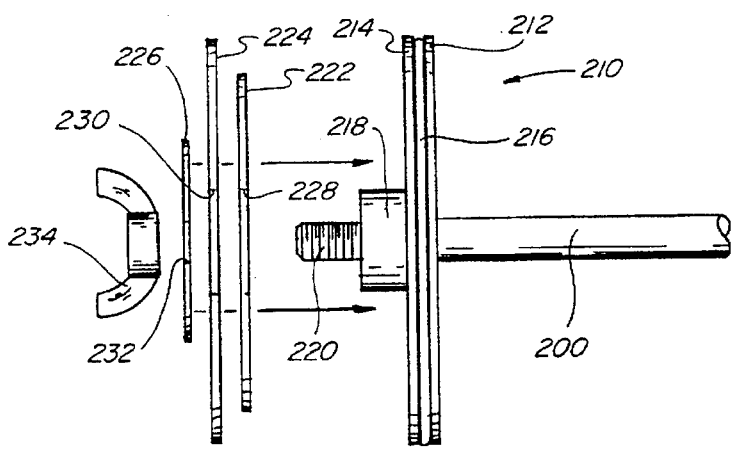
FIG. 8 is a perspective view of a dispensing tube piston.

FIG. 8 illustrates piston rod 200 engaged to a dispensing tube piston 210. Particularly, piston 210 includes a piston member 212 having a groove 214 with an O-ring 216 disposed therein. A shoulder 218 is formed against piston member 212 and a threaded boss 220 extends from shoulder 218 and is axially aligned with rod 200. A rigid disk 222, butterfly valve 224 and washer 226 having openings 228, 230 and 232, respectively, have boss 220 inserted therethrough, and wing nut 234 is threadedly engaged to boss 220. Openings 228 and 230 of disk 222 and butterfly valve 224 are sized so as to enable such disk and valve to slide over shoulder 218 and against piston 212. Opening 232 of washer 226, however, is sized to prevent such washer from sliding over shoulder 218. Butterfly valve 224 is constructed from flexible material such as a thin plastic, e.g., vinyl or other comparable plastic material, so that the edges of such valve 224 can flex as described herein.

Figure 9A:
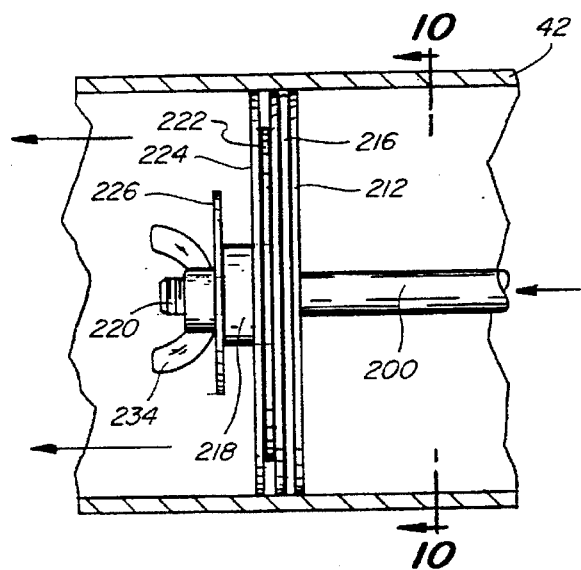
FIGS. 9A–B illustrate the mix flow when the dispensing tube piston is moving toward the outlet end of the dispensing tube and when the piston is moving toward the inlet end of the dispensing tube, respectively.

In operation, and as best shown in FIG. 9A, as piston rod 200 is moved in an axial direction towards the dispensing end of dispensing tube 42, butterfly valve 224 and disk 222 slide along shoulder 218 and against piston 212. Disk 222 provides sufficient support for valve 224 so that valve 224 does not deform and allow mix to flow through piston 212. As discussed in more detail later with reference to FIG. 10, disk 222 covers openings formed in piston 212 through which mix may flow.

Importantly, when moving the direction illustrated in FIG. 9A, piston 212 including o-ring 216 and valve 224 form a seal with the walls of tube 42. As piston 212 moves axially through tube 42 as illustrated, any mix disposed within bowl 10 will be drawn into tube 42 between piston 212 and the inlet end of tube 42.

Figure 9B:
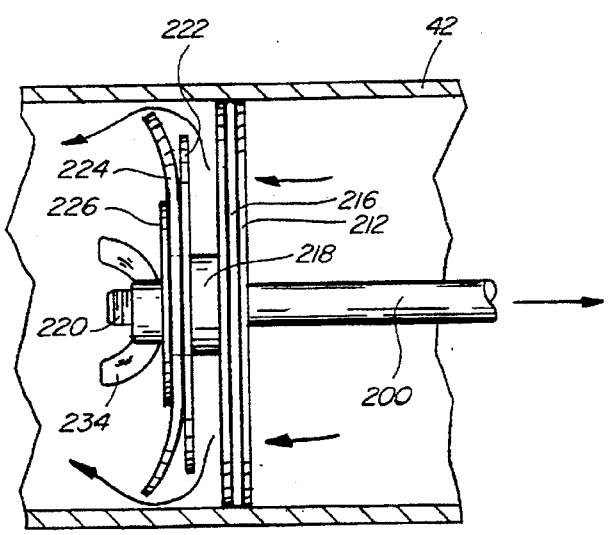

As shown in FIG. 9B, when piston rod 200 is moved towards the outlet end to the inlet end of tube 42, butterfly valve 224 and metal disk 222 slide over shoulder 218 and adjacent to washer 226. The edges of butterfly valve 224 are substantially unsupported and "flex" so as to allow mix to flow therearound. Particularly, mix flows through piston 212, as explained with reference to FIG. 10, and around valve 224 and washer 222.

FIG. 10 is a cross sectional view of piston 212 through line 10—10 in FIG. 9A. As clearly shown in FIG. 10, openings 236A–D are formed in piston 212 and disk 222 and valve 224 are sized so that as piston 212 is moved towards the outlet end of dispensing tube 42 (see FIG. 9A), openings 236A–D are covered by such disk 222 and valve 224. This prevents any mix disposed between piston 212 and the outlet end of tube 42 from flowing through openings 236A–D. As piston 212 moves from the outlet end to the inlet end of tube 42 (see FIG. 9B), however, washer 222 and valve 224 slide to the opposite end of shoulder 218 and mix flows through openings 236A–D.

Figure 11A:
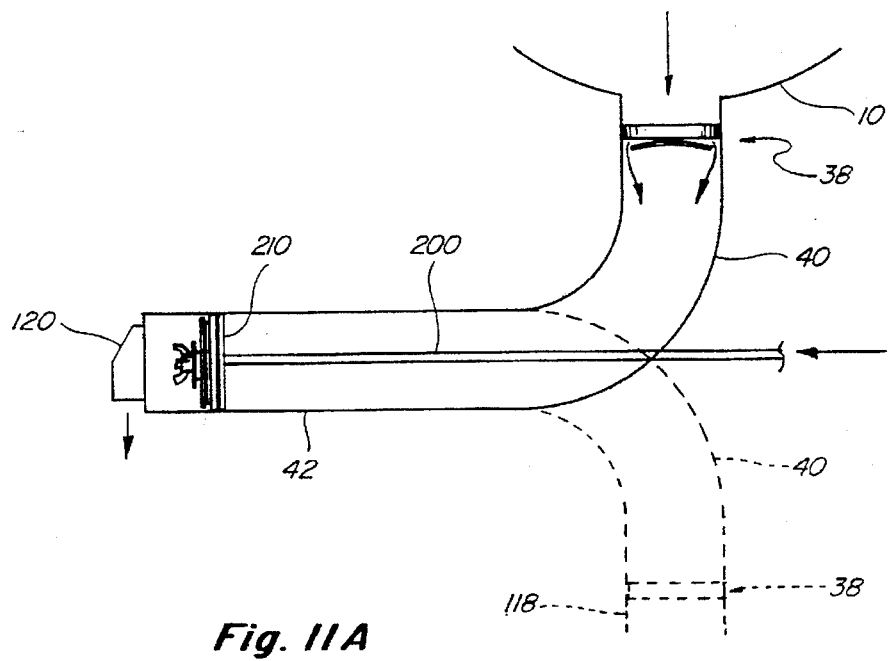
FIGS. 11A–B are partial cross-section view, with parts broken away, illustrating the flow of mix in the dispensing tube for the top feed and bottom feed (in phantom) assemblies.
Figure 11B:
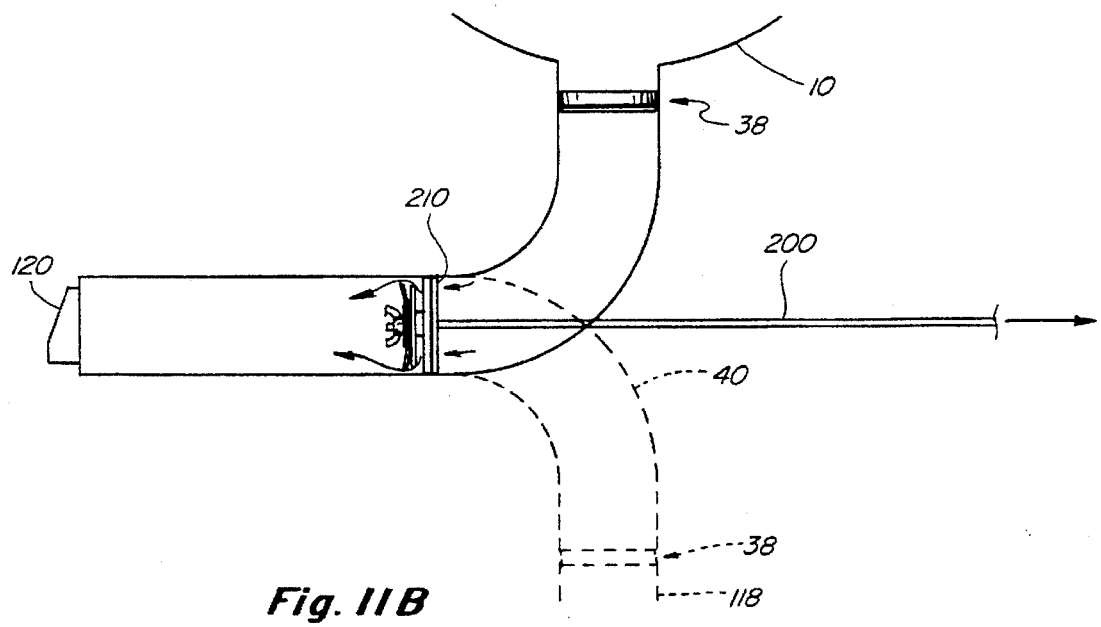

The flow of mix with respect to movement of piston 210 perhaps is best shown in FIGS. 11A–B. Particularly, in FIG. 11A, piston 210 is being driven by piston rod 200 towards the outlet end of dispensing tube 42. As piston 210 moves in such direction, mix is forced out through nozzle 120 and mix is pulled from bowl 10 through check valve 38 and fitting 40 and into tube 42. Shown in phantom in FIG. 11A is the configuration for a bottom feed assembly. It should be understood that for such bottom feed assembly, the flow of mix is identical to the flow of mix for the top feeder assembly.

FIG. 11B clearly shows that when piston 210 is moved axially in the opposite direction, check valve 38 closes so as to prevent the flow of mix back into bowl 10, and piston 210 operates so as to allow mix to flow therethrough and into the space between piston 210 and the outlet end of tube 42.

Figure 12:
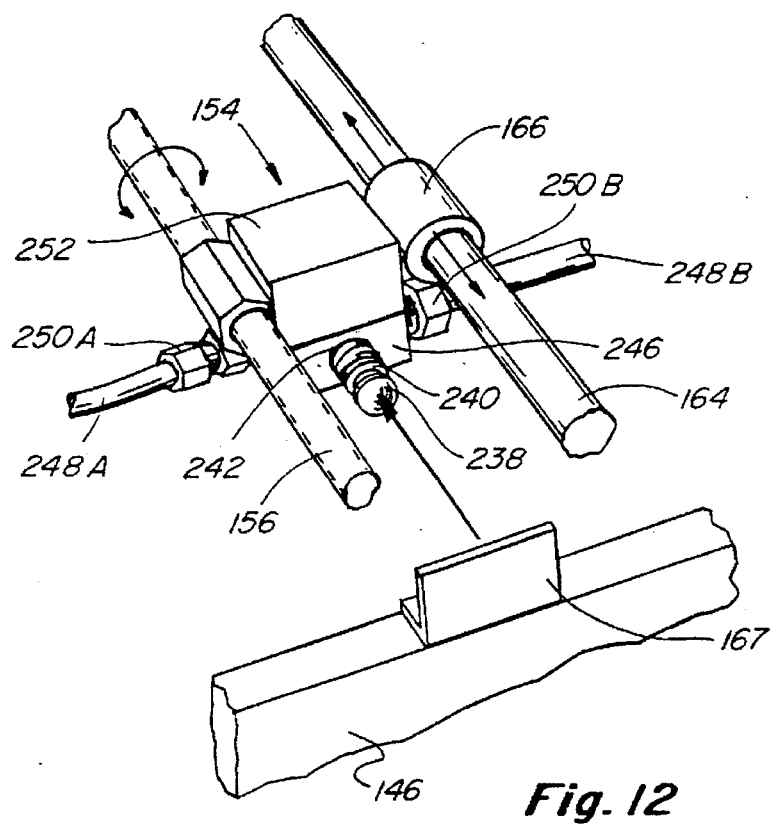
FIG. 12 is a perspective view, with parts broken away of a piston rod position sensor disposed within the dispensing tube piston drive unit.

With respect to the stroke length of piston rod 200, and as hereinbefore discussed, a position sensor 154 including a compressible sensor 238 is illustrated in FIG. 12. The extent to which sensor 238 extends from sensor housing 246 is determined by the length of boss 240. Boss 240 extends through an opening 242 formed in housing 246. Air tubes 248A–B are connected to sensor housing 246 by couplers 250A–B. Air tubes 246A–B are part of the pneumatic circuit hereinafter described.

Figure 13:
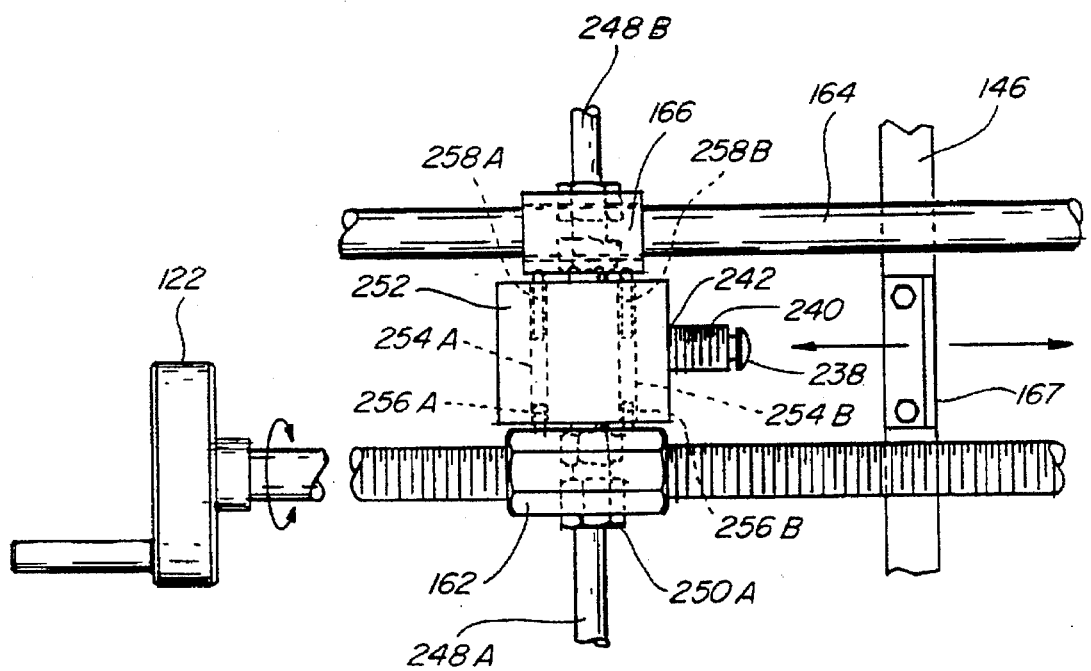
FIG. 13 is a top view, with parts broken away, of the position sensor illustrated in FIG. 12.

An alignment block 252 is mounted to sensor housing 246 and, as best shown in FIG. 13, includes two parallel channels 254A–B formed therein. Two alignment pins 256A–B extend from within channels 254A–B, respectively, and are engaged to threaded guide member 162. Two alignment pins 258A–B extend from within channels 254A–B, respectively, and are engaged to guide member 166. Although not shown, two threaded screws pass through aligned threaded openings formed in housing 246 and alignment block 252. The screws serve to maintain housing 246 and block 252 in alignment and also maintains sensor 238 in place relative to housing 246.

To adjust the position of sensor 238, threaded rod 156 is manually rotated by a user utilizing handle 122. Depending on the direction of threads on rod 156, if handle 122 is rotated in one direction, position sensor 238 slides along slide bar 164 in one direction. Rotation of handle 122 in the other direction moves sensor 238 in the opposite direction. As sensor 238 is moved closer towards base plate 128B, the stroke length of piston 210 is shortened. As sensor 238 is moved further away from base plate 128B, the stroke of piston 210 is increased. Of course, increasing the stroke length of piston 210 increases the mount of mix dispensed with each piston stroke.

More particularly, in operation, slider plate 146 moves towards sensor 238 and when trigger plate 167 depresses sensor 238, a control signal is emitted from sensor 238 through air tubes 248A–B. As hereinafter described in detail, the pneumatic control system then causes the drive pistons disposed within cylinders 52 and 54 (not shown in FIG. 13) to reverse direction. Since the piston rods coupled to such pistons drive slider plate 146, slider plate 146 also changes direction. The drive pistons continue moving in such direction until the pistons are disposed in their initial positions, and the process is repeated.

Alignment block 252 performs the important function of preventing sensor housing 246 from becoming skewed relative to rods 156 and 164. Such skewing could greatly affect the precision in controlling the ease of movement and possible lock-up of housing 246.

Figure 14:
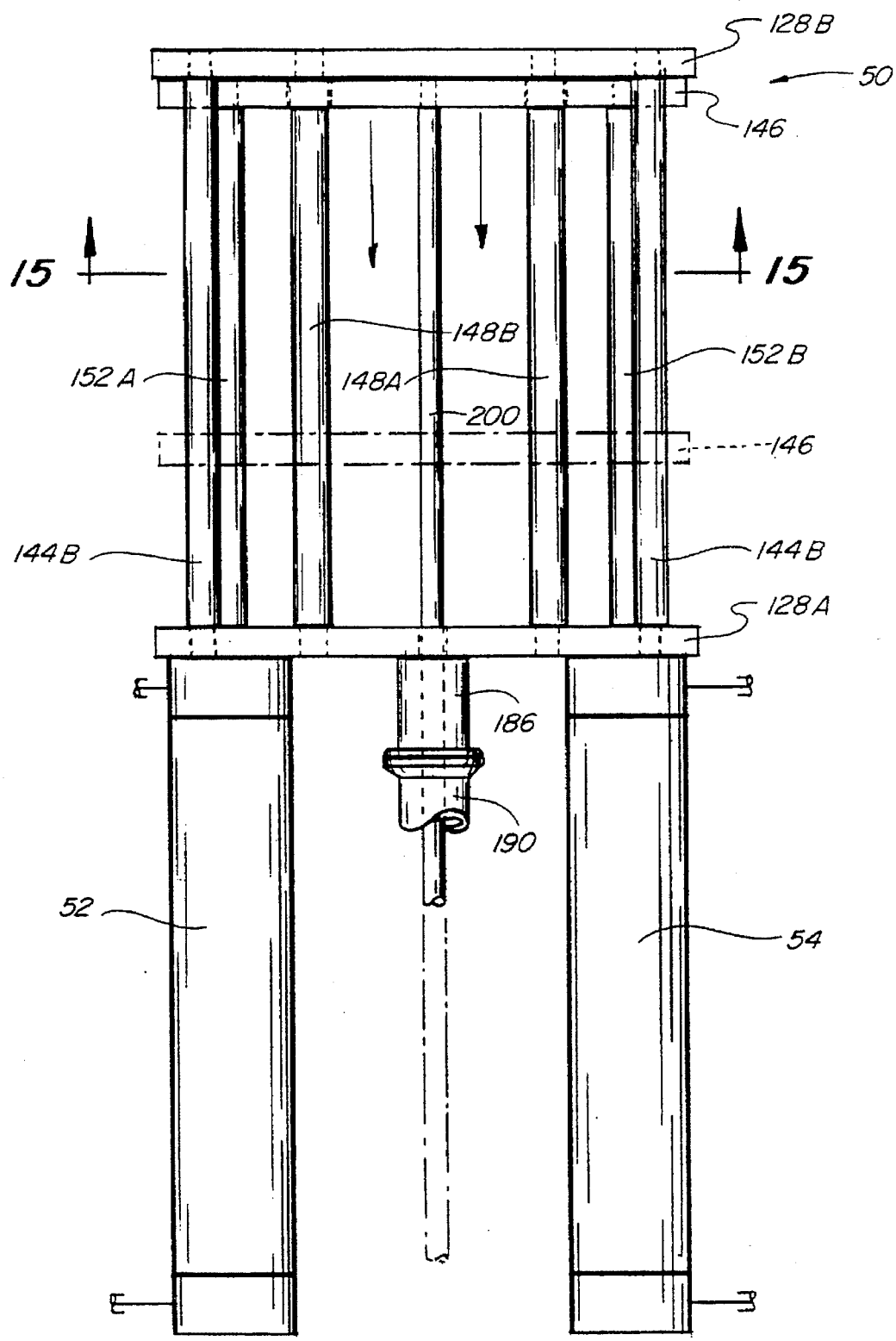
FIG. 14 is a top view, with parts broken away, of the dispensing tube piston drive unit.

FIG. 14 is a top view with parts cut away of drive unit 50 and is provided to illustrate movement of slider plate 146. Slider plate 146 is shown in phantom as being disposed at a distance from base plate 128B and is shown as having an initial position immediately adjacent base plate 128B. Slider plate 146 slides along guide rods 148A–B. Such rods 148A–B assist in keeping plate 146 properly aligned. Piston rods 152A–B which slide into and out of piston cylinders 52 and 54 at one end respectively are threadedly engaged at their other ends to slider plate 146. Piston rod 200 which drives dispensing tube piston 110 (not shown in FIG. 14) also is threadedly engaged to slider plate 146. As slider plate 146 moves from its initial position adjacent base plate 128B to a position such as shown in phantom, piston rod 200 drives dispensing tube piston 110 towards the tube outlet thereby forcing mix out the dispensing end of tube 42 and drawing mix into tube 42 from bowl 10.

Figure 15:
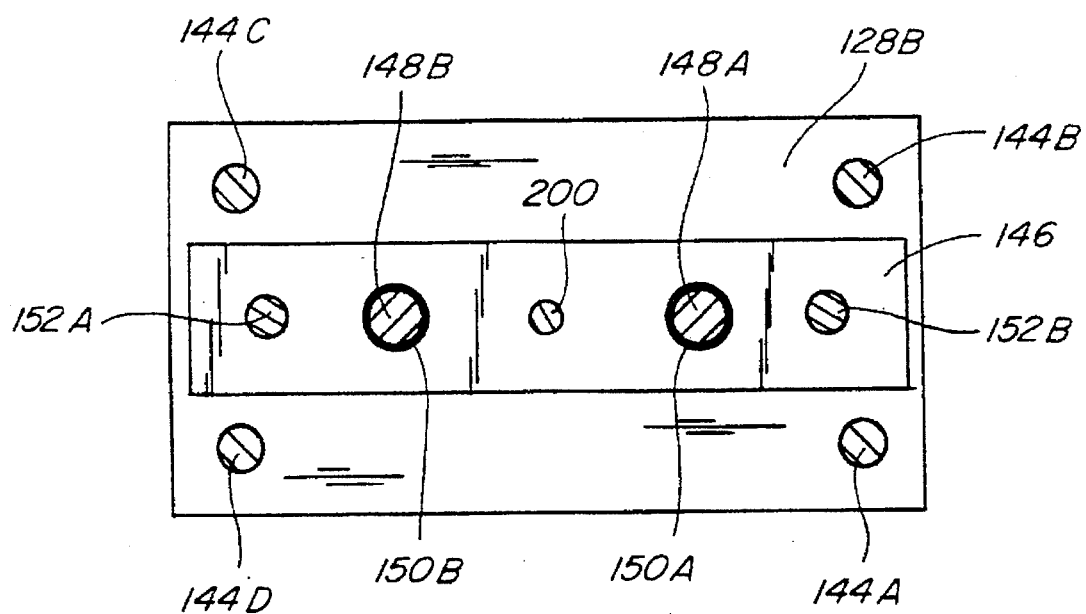
FIG. 15 is a view of the piston drive unit through line 15—15 in FIG. 14.

FIG. 15 is a view through line 15—15 in FIG. 14. The relative positions of braces 144A–D, guide rods 148A–B (including bushings 150A–B), drive piston rods 152A–B, and dispensing tube piston rod 200 are clearly shown in FIG. 15.

Figure 16A:
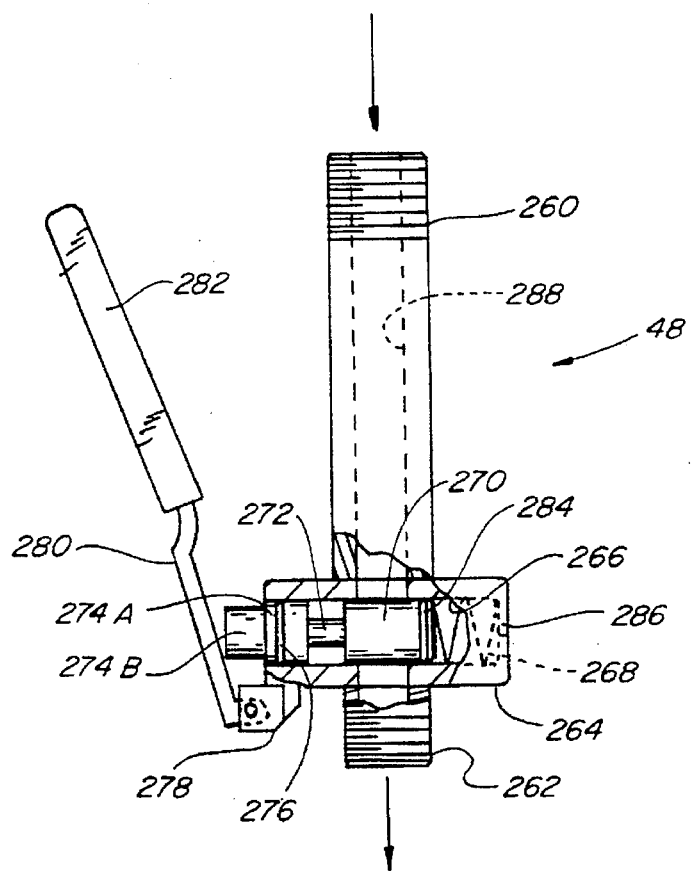
FIGS. 16A–C illustrate a nozzle, and components therefor, which may be coupled, via a flexible tube, to the outlet end of the dispensing tube.
Figure 16:
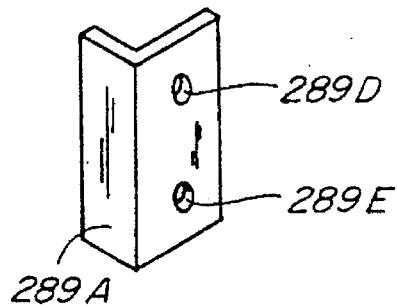
Figure 16:
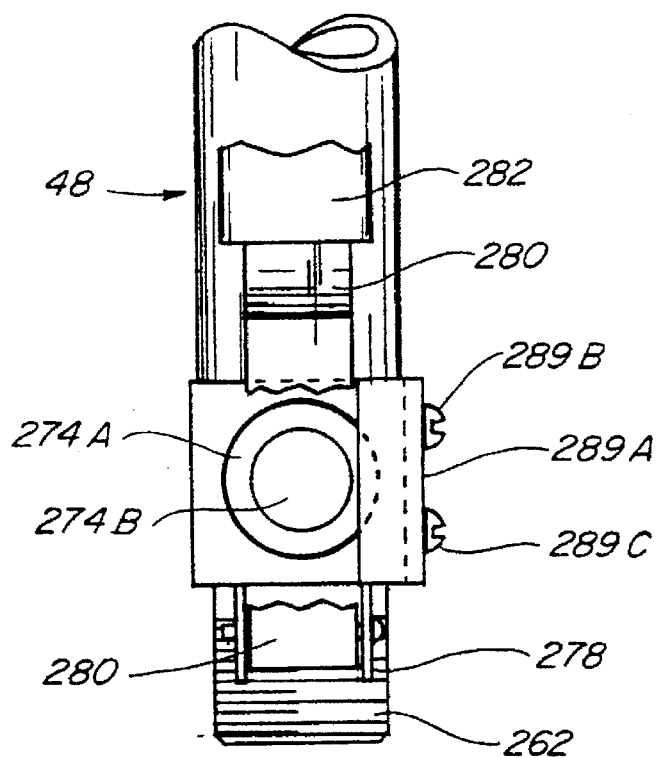

FIG. 16A is a side view of nozzle 48, in partial cross-section with parts cut-away, which may be utilized with the present dispensing device. Particularly, nozzle 48 includes a threaded end 260 which may be engaged to ball swivels (not shown in FIG. 16) that connect to a flexible tube coupled to the outlet end of dispensing tube 42. The other end of nozzle 48 includes threads 262 which are provided so that one of many nozzle outlet forms may be engaged to nozzle 48. For example, in applying frosting onto a cake, different types of nozzle outlets would be utilized. Nozzle 48 also includes a cross member 264 having a channel 266. Disposed within channel 266 is a spring 268 biased against a plunger 270. Plunger 270 has a pass through area 272 and portions 274A and 274B. Portion 274A has a larger diameter than portion 274 B and has an o-ring 276 mounted in a groove formed therein. A hinge 278 which is coupled to a handle 280 including a grip 282. An o-ring 284 also is disposed in a groove formed in plunger 270. An air vent 286 is formed in member 264 and is axially aligned with channel 266. A channel 288 extends the length of nozzle 48 and is blocked by plunger 270 due to the biasing of spring 268. Plunger 270 therefore prevents mix from flowing through channel 288 and out through the end of nozzle 48. However, when a user squeezes handle 282 to bring it up against the body of nozzle 48, plunger 270 compresses spring 268 and only pass through area 272 remains in channel 288. Mix then flows around pass through area 272 and out of the end of the nozzle 48. When the desired amount of mix has been dispensed, the user releases handle 280 and plunger 270 once again blocks mix flow. A pin (not shown) may be attached to hinge 278 and placed so as to prevent handle 280 from swinging down below the outlet of nozzle 48.

FIG. 16B is another view, with parts broken away, of nozzle 48 and cross member 264 including an L-shaped bracket 289A threadedly engaged to member 264 by two threaded bolts 289B and 289C. A portion of bracket 289A extends into the path of plunger 270 and is disposed to prevent plunger 270 from completely withdrawing from channel 166. Particularly, the extent to which spring 268 forces plunger 270 towards handle 280 is limited by contact between portion 274A and bracket 289A.

FIG. 16C illustrates L-shaped bracket 289A in more detail. Bracket 289A includes openings 289D and 289E which have bolts 289B and 289C pass therethrough.

Figure 17:
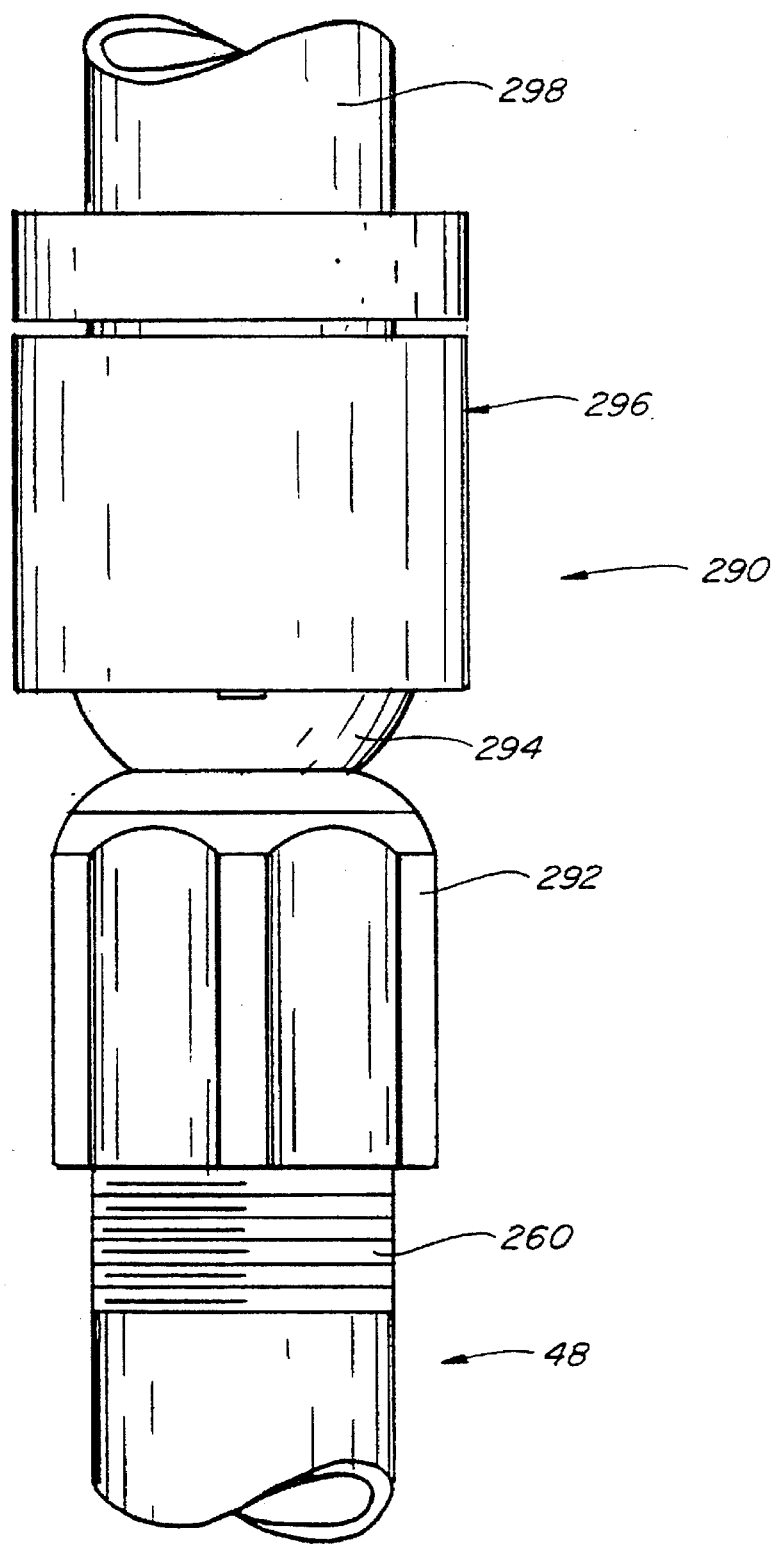
FIG. 17 is a side view of a ball joint which may be connected to the nozzle illustrated in FIG. 16.

FIG. 17 illustrates a ball joint 290 which may be threadedly engaged to threaded end 260 of nozzle 48. Particularly, a threaded coupling 292 is sized to threadedly engage the threads at end 260 of nozzle 48. A ball 294 and swivel 296 are movably connected to coupling 292. A conduit 298 extends from swivel 296. Conduit 298 may be connected, for example, to a flexible tube coupled to the outlet end of dispensing tube 42. In operation, a user may freely move nozzle 48, and ball 294 and swivel 296 accommodate such movement without twisting the tube coupled to the dispensing device. To provide additional degrees of freedom, another ball and swivel joint can be coupled to conduit 298.

Figure 18:
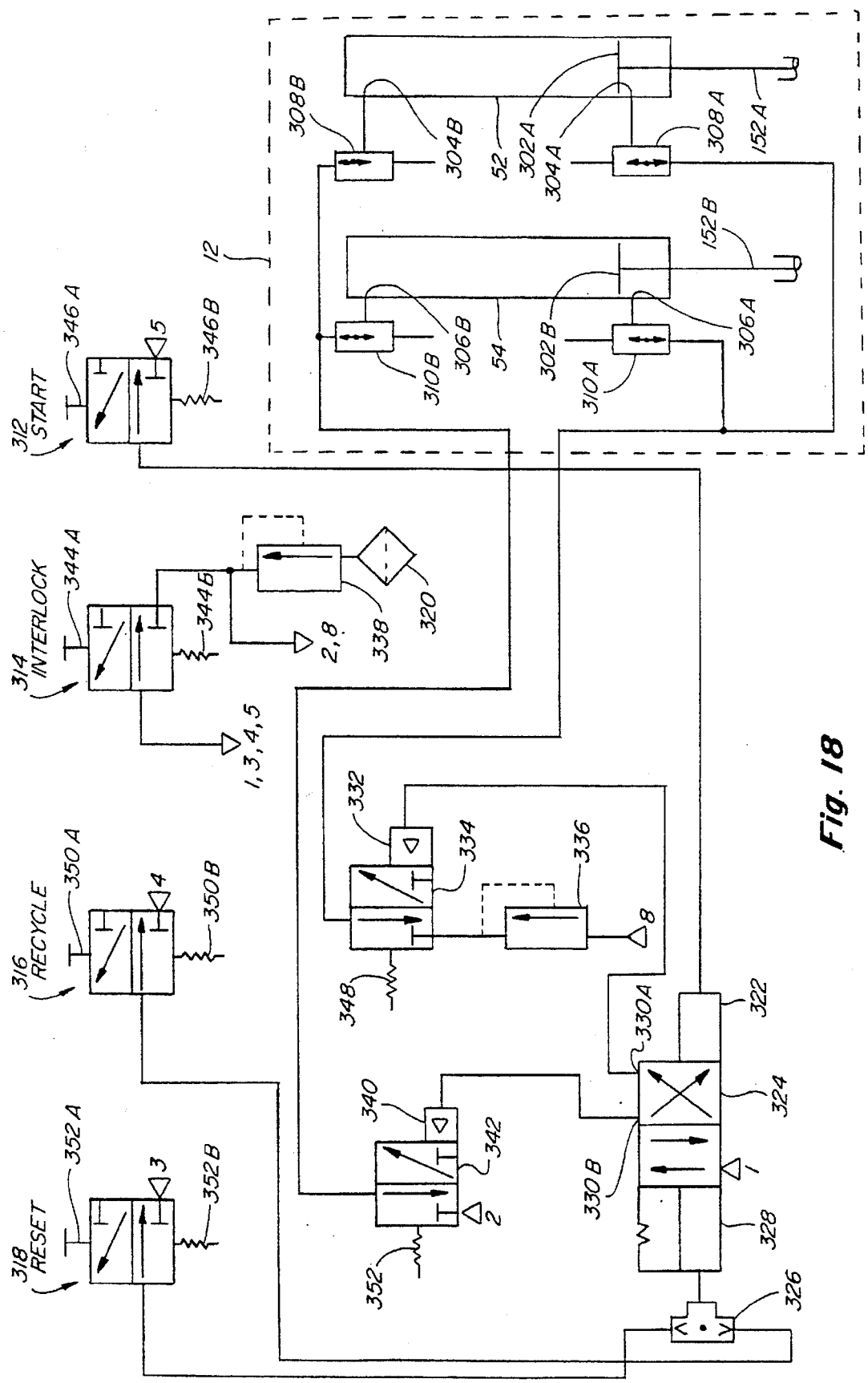
FIG. 18 illustrates the pneumatic circuit utilized to energize the dual pistons of the drive unit.

FIG. 18 illustrates air circuit 300 which controls operation of drive unit 12. Cylinders 52 and 54, including piston rods 152A-B, respectively, of drive unit 12 are shown in FIG. 18. Pistons 302A-B are shown as being coupled to piston rods 152A-B, respectively. Air ports 304A-B are formed on cylinder 52 and air ports 306A-B are formed on cylinder 54. Exhaust valves 308A-B are coupled to ports 304A-B via air tubes and exhaust valves 310A-B are coupled to ports 306A-B via air tubes. As explained in more detail hereinafter, air flows into and out of ports 304A-B and 306A-B so as to control movement of pistons 302A-B.

Circuit 300 further includes a start valve 312, an interlock valve 314, a recycle valve 316 and a reset valve 318. Air supply 320 is coupled to interlock valve 314. Start valve 312 couples to an actuator 322 which controls movement of a valve 324. Reset valve 318 is coupled, through a one-way control valve 326, to an actuator 328 which also controls valve 324. Valve 324 is coupled at port 330A to actuator 332 which controls valve 334. A pressure regulator 336 is coupled, at one end, to valve 334 and at its other end to pressure regulator 338. Valve 324 is coupled at port 330B to actuator 340 which controls a valve 342, which also is coupled to pressure regulator 338 (connector 2). Various connectors are illustrated in circuit 300 by connector triangles labeled to correspond to its connection. Also, springs are illustrated in connection with some valves to indicate the direction of relative movement of such valve under control of its respective actuator.

The valves and actuators forming circuit 300 are commercially available. Table 1 below lists the valve model number or name, by corresponding reference number, to valves commercially available from Humphrey Products Company, P.O. Box 2008, Kalamazoo, Mich., 49003.

TABLE 1

| Reference Number | Name/Model # |
| --- | --- |
| 308A-B, 310A-B | Quick Exhaust Valves |
| 312 | 3P |
| 314 | 31P, Held normally open by housing 126 |
| 316 | 31P |
| 318 | 31P |
| 320 | PSH-100-A/A |
| 322, 324, 330, 328 | 41PP with 341AR and 341A Air Pilots |

TABLE 1-continued

| Reference Number | Name/Model # |
| --- | --- |
| 326 | S125 Shuttle |
| 332, 334 | 250 A-3-10 |
| 336 | RO6 |
| 340, 342 | 250 A-3-10 |

With respect to operation of circuit 300, interlock valve 300 will be disposed in an open condition if housing 126 (FIG. 5) is in place for operation. Particularly, push actuator 344A and spring 344B act to open valve 314 so that air flows from supply 320 through valve 338 and through valve 314 to the indicated connectors (i.e., connectors 1, 3 4 and 5). If housing 126 is not in proper operating position, however, push actuator 344A will not be depressed and spring 344B causes valve 314 to close therefore preventing the flow of air in circuit 300.

Once housing 126 is in operating position, a user manually depresses actuator 346A of valve 312. Actuator 346A and spring 346B open valve 312 and air flows (connector 5) therethrough to actuator 322. Actuator 322 causes valve 324 to open port 330A thereby directing air to actuator 332. Once actuator 332 is actuated, it opens valve 334 depressing spring 348. Air therefore flows from source 320 (connector 8) through valves 336 and 334 to exhaust valves 308A and 310A. Air flows through such exhaust valves 308A and 310A and into cylinders 52 and 54 behind pistons 302A-B, respectively. The air forces pistons 302A-B to move towards ports 304B and 306B. Piston rods 152A-B, which are coupled to slider rod 146 (FIG. 5), move with pistons 302A-B. As slider rod 146 moves with piston rods 152A-B, mix is dispensed from the dispensing tube at the tube outlet and mix is drawn into the dispensing tube at the tube inlet as hereinbefore described in detail.

When slider plate 146 contacts the position sensor 154 (FIG. 5), recycle switch 316 is opened, i.e., actuator 350A and spring 350B are depressed. Air therefore flows through valve 316 to one-way valve 326 and actuates actuator 328. Actuator 328 causes valve 324 to open port 330B and allowing air to flow to actuator 340. Actuator 340 moves valve 342 to an open position thereby depressing spring 352. Air then flows from source 320 (connector 2), through valve 338 and to exhaust valves 308B and 310B. Air flows through exhaust valves 308B and 310B and into cylinders 52 and 54. Such air flow causes pistons 302A-B to move towards ports 304A and 306A. Air escapes from cylinders 52 and 54 to exhaust valves 308A and 310A where the air is emitted from the system.

Such movement of the pistons causes piston rods 152A-B to reverse direction, which in turn causes slider plate 146 to reverse direction. When slider plate 146 reverses direction, the dispensing tube piston reverses direction. As hereinbefore described in detail, when the dispensing tube piston moves in such direction, mix is allowed to flow through such piston. If more mix is to be dispensed, a user once again depresses actuator 346A which initiates another cycle.

Circuit 300 can be reset by depressing actuator 352A, and actuator 352A and spring 352B act to open reset valve 318. When valve 318 opens, air flows from source 320, through interlock valve 314 and through valve 318 to one-way flow valve 326. The air is directed to actuator 328, which causes valve 324 to open port 330B. Circuit 300 then operates as described above once valve 330 opens to cause pistons 302A-B to be moved towards ports 304A and 306A, respectively. In this manner, the dispensing tube piston can be moved from any position within the dispensing tube to a position where the piston is ready to fully dispense a controlled amount of mix.

From the foregoing detailed description, it is evident that the present dispensing device utilizes controllable forces, i.e., the forces created by driving the piston towards the outlet end of the dispensing tube, other than or in addition to gravity forces, in connection with dispensing mix from a bowl. As a result, the present device is extremely flexible in that a mixing bowl can be disposed at any position relative to the device, including below the device, and mix will still be efficiently dispensed. Also, the present device is self-priming even when utilizing thick mix, and does not operate at high pressures. Moreover, since the dispensing tube is relatively short, the dispensing assembly can be easily cleaned. The bowl follower configuration also assists in cleaning the bowl. By controlling the stroke length of the dual pistons, the amount of mix dispensed with each stroke can be accurately controlled. In addition, the present device provides a more ergonomic-friendly manner for dispensing mix from a bowl including the elimination of having to lift a bowl and easy dispensing of mix from the tube outlet.

From the preceding description, it is evident that the objects of the present invention are attained. Although various embodiments of the invention have been described and illustrated in detail, it is to be clearly understood that the same are intended by way of illustration and example only and are not to be taken by way of limitation. Accordingly, the spirit and scope of the invention are to limited only by the terms of the appended claims.

What is claimed is:

1. A self-priming dispensing device for dispensing a predetermined amount of bakery mix from a bowl, said device comprising:

a dispensing tube having an inlet adapted to draw mix from the bowl and having an outlet;

a check valve adapted to be disposed in flow communication between the bowl and the dispensing tube inlet, said check valve including a flow channel therethrough and flow control means adjacent one side thereof for allowing mix to flow in only one direction therethrough;

a dispensing tube piston disposed within said dispensing tube, at least a portion of said piston being in slidable contact with the interior wall of said tube, said piston having at least one opening therethrough and including a valve portion which allows mix to flow in only one direction therethrough, from the dispensing tube inlet side toward the dispensing tube outlet side;

a piston rod connected to said dispensing tube piston;

piston rod driving means coupled to said dispensing tube piston rod adapted to control the movement of said piston rod and associated piston, said driving means including an actuator which, when depressed, initiates operation of the driving means to move said piston; and means associated with said piston rod driving means for reversing the direction of movement of said piston;

such that, during operation of the device, when said piston is moved towards said dispensing tube outlet, mix disposed between said piston and said dispensing tube outlet may be dispensed from said dispensing tube outlet as material in the bowl is drawn, by forces generated by movement of said piston, into said dispensing tube through both said check valve and said dispensing tube inlet, and when said piston is moved towards said dispensing tube inlet, mix disposed between said piston and said dispensing tube inlet flows through said opening of said piston while mix is prevented from flowing from within said dispensing tube toward said bowl by said check valve.

2. A self-priming dispensing device in accordance with claim 1 further comprising a tubular elbow fitting coupled to and between said check valve and said dispensing tube inlet.

3. A self-priming dispensing device in accordance with claim 2 wherein the bowl includes a discharge port disposed at a location above said dispensing tube inlet, said elbow fitting adapted to be connected to the bowl discharge port.

4. A self-priming dispensing device in accordance with claim 3 wherein a bowl follower is disposed within said bowl for preventing cavitation of the mix during operation of said device.

5. A self-priming dispensing device in accordance with claim 1 wherein the bowl is disposed at a location below said dispensing tube inlet, said device further comprising a suction tube, an inlet of said suction tube adapted to be inserted within the mix the bowl and an outlet of said suction tube configured to be coupled to said dispensing tube inlet.

6. A self-priming dispensing device in accordance with claim 5 further comprising a disk coupled to said suction tube and disposed so as to prevent cavitation of the mix during operation of said device.

7. A self-priming dispensing device in accordance with claim 5 wherein said check valve is disposed in flow communication between said suction tube outlet and said dispensing tube inlet so as to prevent flow of the mix from said dispensing tube to the bowl.

8. A self-priming dispensing device in accordance with claim 1 wherein said means associated with said piston rod driving means for reversing the direction of movement includes a compressible sensor.

9. A self-priming dispensing device in accordance with claim 8 further comprising means for manually adjusting the position of said compressible sensor so that the stroke length during operation of said dispensing tube piston is altered.

10. A self-priming dispensing device in accordance with claim 8 wherein said piston rod driving means comprises a slidable plate coupled to said piston rod and at least one driving piston cylinder and rod coupled to said slidable plate to control axial movement thereof.

11. A self-priming dispensing device in accordance with claim 10 wherein the slidable plate includes means associated therewith for contacting said compressible sensor so that the direction of movement of said driving piston rod and slidable plate is reversed when said slidable plate reaches a predetermined position with respect to said compressible sensor.

12. A self-priming dispensing device in accordance with claim 10 further comprising an air circuit in air flow communication with said at least one driving piston cylinder.

13. A self-priming dispensing device in accordance with claim 1 further comprising a flexible tube coupled to said outlet of said dispensing tube.

14. A self-priming dispensing device in accordance with claim 13 wherein a nozzle including a nozzle outlet is coupled to said flexible tube, said nozzle including means to manually control the dispensing of mix from said nozzle outlet.

15. A self-priming dispensing device in accordance with claim 1 wherein said valve portion of said dispensing tube piston includes a flexible member which allows mix to flow around its edges when said piston is moved towards said tube inlet and which contacts the interior wall of said dispensing tube when said dispensing tube piston is moved towards said tube outlet.

16. A self-priming dispensing device in accordance with claim 15 wherein said valve portion of said dispensing tube piston further includes a disk member positioned between said flexible member and said at least one opening of said piston, said disk member adapted to cover said at least one opening as said piston is moved toward said tube outlet, and said piston includes a sealing o-ring extending therearound and contacting the interior wall of said dispensing tube.

* * * * *

UNITED STATES PATENT AND TRADEMARK OFFICE
CERTIFICATE OF CORRECTION

PATENT NO. : 5,634,574
DATED : June 3, 1997
INVENTOR(S) : Brian K. McArthur and David A. McArthur It is certified that error appears in the above-indentified patent and that said Letters Patent is hereby corrected as shown below:

Column 9, line 59, "mount" should be --amount--.

Signed and Sealed this

Twenty-first Day of October 1997

Attest:

BRUCE LEHMAN

Attesting Officer

Commissioner of Patents and Trademarks